(12) United States Patent
Karatzoglou et al.

(10) Patent No.: US 11,429,731 B2
(45) Date of Patent: Aug. 30, 2022

(54) DATA PROTECTION CONFIGURATION FOR ELECTRONIC DEVICES IN A NETWORK

(71) Applicant: Robert Bosch GmbH, Stuttgart (DE)

(72) Inventors: Antonios Karatzoglou, Vancouver (CA); Jan Zibuschka, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 16/618,953

(22) PCT Filed: May 17, 2018

(86) PCT No.: PCT/EP2018/062874
§ 371 (c)(1),
(2) Date: Mar. 3, 2020

(87) PCT Pub. No.: WO2018/224277
PCT Pub. Date: Dec. 13, 2018

(65) Prior Publication Data
US 2020/0387618 A1    Dec. 10, 2020

(30) Foreign Application Priority Data
Jun. 7, 2017   (DE) ..................... 10 2017 209 532.6

(51) Int. Cl.
*G06F 21/60* (2013.01)
*H04L 41/0803* (2022.01)
(Continued)

(52) U.S. Cl.
CPC ........ *G06F 21/604* (2013.01); *H04L 41/0803* (2013.01); *H04L 63/20* (2013.01); *H04W 12/63* (2021.01)

(58) Field of Classification Search
CPC .... G06F 21/604; H04L 41/0803; H04L 63/20
(Continued)

(56) References Cited

U.S. PATENT DOCUMENTS

2008/0147872 A1\* 6/2008 Regnier ................. H04L 67/16
709/230
2014/0187200 A1   7/2014 Reitter et al.
(Continued)

FOREIGN PATENT DOCUMENTS

DE   102005040924 B3   11/2006
DE   112005001833 T5   6/2007
(Continued)

OTHER PUBLICATIONS

International Search Report for PCT/EP2018/062874, dated Jun. 27, 2018.
(Continued)

*Primary Examiner* — Anthony D Brown
(74) *Attorney, Agent, or Firm* — Norton Rose Fulbright US LLP; Gerard Messina (57) ABSTRACT

A method, a data protection module and a network system for protecting data of an electronic device, on which sensitive data are recorded or supplied; the sensitive data being processed by external services, in particular, Internet services. The data protection module is used for automatically computing data protection configurations for the device on the basis of device metadata and service metadata.

12 Claims, 3 Drawing Sheets

(51) Int. Cl.
*H04L 9/40* (2022.01)
*H04W 12/63* (2021.01)

(58) Field of Classification Search
USPC .............................................. 726/1
See application file for complete search history.

(56) References Cited

U.S. PATENT DOCUMENTS

2015/0373053 A1  12/2015  Hu et al.
2017/0140164 A1   5/2017  Bellamy et al.

FOREIGN PATENT DOCUMENTS

DE  102015209371 A1  12/2015
DE  102015203745 A1   9/2016

OTHER PUBLICATIONS

Bin Liu et al: "Follow My Recommendations: A Personalized Privacy Assistant for Mobile App Permissions", Usenix, Usenix, the Advanced Computing Systems Association 22. Jun. 2016, pp. 32-46, XP061025007.
Huichen Lin et al: "IoT Privacy and Security Challenges for Smart Home Environments", Information, vol. 7, No. 3, 13. Jul. 2016, XP055485161.

* cited by examiner

DATA PROTECTION CONFIGURATION FOR ELECTRONIC DEVICES IN A NETWORK

FIELD OF THE INVENTION

The present invention lies in the areas of network technology and electronics and relates, in particular, to data protection assistance in response to the installation of an electronic device in a network.

BACKGROUND INFORMATION

In the related art, it is believed to be understood that the user may be assisted in the setting of security configurations. Thus, US 2014/0187200 A1 discusses a system, which automatically computes security settings for a smartphone or another mobile device on the basis of positional data.

Patent document DE 10 2015 203 745 A1 discusses a method to make devices, which are newly integrated in a network, available to a webcrawler, and to administering them.

In addition, DE 11 2005 001 833 T5 and DE 10 2015 209 371 A1 discuss approaches for improving security in networks. DE 10 2005 040 924 B3 refers to a method for facilitating the operation of devices through provision of an operator interface.

SUMMARY OF THE INVENTION

Possible application scenarios for such networked device configurations include the Internet of Things, the area of "ubiquitous computing," of "pervasive computing," or of Industry 4.0 systems, such as a wireless sensor network in the automotive sector or in the smart home sector.

If, e.g., a plurality of devices are interconnected in a smart home network, then a smart home controller may be provided, in order to orchestrate the communication of the devices among themselves and/or with connected servers. Sensor data (temperature, humidity, analog signal characteristics, etc.) may be recorded on the devices.

The (sensor) data recorded locally on the devices are transmitted to distributed services for processing (e.g., for controlling or regulating other devices). In order to adhere to data protection conditions for electronic devices, which are integrated in networked structures, configurations specific to data protection must be established, which determine, for example, which data of the device may be transmitted, in which form, and under what conditions, to which linked network devices or servers. This is used for protecting data of the device user. Normally, in response to installation of the specific device, the user must set his/her data protection measures. Since, as a rule, a plurality of electronic devices are present and a plurality of services are available, this may be a complex task.

It is desirable to improve the data protection configuration in response to integration of a device in a network. In particular, it should be automated for the user and assist him/her in the necessary inputs within the scope of the device installation. In addition, the data protection configurations should be adjusted to the available processing services and to current data protection configurations of devices already integrated in the network.

The present invention relates to subject matter according to the independent claims. Advantageous specific embodiments are the subject matter of the dependent claims, the specification and the drawing.

According to a first aspect, the present invention relates to a method for integrating an electronic device in a network in an automated manner configured for data protection, so that on the electronic device, locally acquired data (e.g., sensor data or other device data . . . ) may be transmitted to a service in the network for the purpose of processing, the method including the following method steps:

acquiring and, possibly, aggregating device metadata for the electronic device;

acquiring and, possibly, aggregating service metadata of services, which are suitable for processing the data recorded on the electronic device;

computing data protection configurations for configuring the data protection for the electronic device in response to its integration in the network, on the basis of the acquired device metadata and the acquired service metadata.

In the following, the terminology used within the scope of this application is explained.

The device is an electronic device, in which data are recorded or generated. To acquire data, the device may include a number of sensors (in the simplest case, one sensor, normally, a number of different sensors), so that sensor data are recorded locally on the device. Cumulatively, or as an alternative, it is also possible that on the device, no data are recorded directly by sensors), but that data are generated. In one specific embodiment of the present invention, in order to generate data, the device includes a digital processing unit (e.g., in the form of an application-specific, integrated circuit (ASIC) of an embedded processor, controller or microcontroller). Consequently, data may be generated from input data acquired via an interface. Alternatively, the data (e.g., sensor data) recorded on the device may be preprocessed directly with the aid of the processing unit, in order to generate preprocessed data that are intended for further processing by a service. The device may be addressed via a network interface. The device is intended to be integrated in the network system. It may be a mobile device, such as a smartphone or a sensor-based device (e.g., a primary detector), which communicates via a radio link. A plurality of different devices may be integrated in the network. One of the devices already integrated in the network may be used as a control unit and take on control tasks for the other devices of the network. It may be configured with a user interface for interaction with a user.

The devices may communicate directly with each other or indirectly, arranged by a communications entity, e.g., a so-called communications control unit (CCU). To that end, the devices may exchange data over a first network, such as an LAN (local area network), a radio-based network, or another wireless or wired network. The devices form a device group. The devices of the device group may each exchange data with a second network via an exchange (e.g., gateway). A group of servers, on which, in turn, at least a portion of the services may be implemented and may be executable, is installed in the second network. The second network may be, e.g., a cellular network (e.g., according to a 3G-based or 4G-based standard, such as UMTS or LTE or their implementations, such as HSPA+ and their further developments). In the same way, the second network may be a network according to an IEEE 802.15.4 standard, which is suitable, above all, for wireless sensor networks (WSN) and for sensors and actuators carried directly on the body (WBAN, wireless body area network); or the second network may be a network based on a different standard for radio communications networks, such as ZigBee, or a WLAN network, e.g., according to a standard of the IEEE 802.11 family. An IP-based protocol (e.g., IPv4, IPv6) may also be used. In one specific embodiment of the present invention, the first and the second networks differ and may be based on a different standard: The first network is, particularly, a local sensor network, and the second network is IP-based. In an alternative specific embodiment of the present invention, it may also be the same network.

The service is used for processing data, and in particular, the data that have been recorded or generated on the devices. A plurality of services having different functions may be provided in the network. A service may be installed on a device integrated in the network or, in particular, in the case of complex services, distributed over a plurality of devices. Therefore, in one specific embodiment of the present invention, data recorded locally on a first device may be transmitted to a service, which is installed on another device of the device group, for the purpose of processing. However, a service may be installed on a server, which is accessible by the device via a network connection. The service may be, e.g., a location-based service, which ascertains results data, e.g., as a function of the detected position of the device. The service may be installed on one or more servers of the group of servers. However, the service may be implemented on a server and may be reached via a piece of Internet infrastructure (e.g., accessible via a network access point (NAP) and relayed over an Internet exchange point (IXP) and further Internet backbone nodes).

The data channel, which between the device that is intended to be integrated in the network (but is not yet), and a control unit, in which the method may be executed, may be set up before the device is integrated in the network. Consequently, the network may not be used yet for exchanging data. The data channel may be set up, e.g., by sending a bijective communications address (IP address or MAC address) of the device. Alternatively, a specific data exchange protocol according to a different standard may also be used. For example, a cable connection set up at least temporarily or an additional wireless connection, e.g., an optical connection or a radio link, may be used for that.

The device metadata are a number of device-specific parameters, which are relevant to the configuration of security parameters, such as a device type, a type of sensor data recordable on the device or supplied device data, a location of the device, and/or a version of the device. Which parameters should be acquired as device metadata, may be configurable in a preparation phase of the method. The device metadata may be inputted manually by the user of a control unit via a provided user interface and/or by fetching out a code (e.g., a QR code or another machine-readable, optical code) present in the device, and may be ascertained or supplemented via network access on the part of the control unit. The device metadata may be requested by the control unit, using a command prompt sent to the device. The data exchange in regard to this may be executed via the data channel set up at least temporarily. Alternatively, the device metadata may be acquired by other devices, which are already integrated in the network and monitor the technical actions of the device.

The service metadata include a number of service-specific parameters, which are relevant to the configuration of security parameters of the specific device, such as which type of service, what purpose the data processing of the service has, to which entities the processing result of the service is passed on, the location of the server and/or the organization that operates the server. Which parameters should be acquired as service metadata, may be configurable in a preparation phase of the method, as well. The further modalities mentioned above in connection with the device metadata are also valid for the service metadata.

The data protection configurations are digital data that determine, which data of the device (locally recorded sensor data and/or ascertained device data) should be transmitted later in an operating phase of the device, to an external (processing) service in response to executed integration of the device in the network, as well as in what form (encrypted/plain, complete/partial, type of communications protocol, etc., direct transmission to the service or indirect via other nodes, etc.), and under what conditions (e.g., processing modalities of the service and/or of the server; in this case, complex rules may also be stored and considered), and in what manner (e.g., only distributed in accordance with a Shamir's Secret Sharing method, according to a predefinable time scheme, transmission scheme with use of a spooler, etc.).

The data protection configurations code an access protection mechanism, which protects sensitive data (of the devices) from unauthorized access on the part of external services. The data protection configurations may be computed automatically from the metadata (of the device and of the service). In this context, characteristic values of the specific device are compared to characteristic values of the processing service ("Which service may process which data?"). The data protection configurations may be confirmed by a validation signal of a user or modified (e.g., via inputs on a user interface of a device). In order to increase the security of the system, the data protection configurations are not transmitted to the device for configuring the data protection parameters, and caused to be implemented there, until the user has confirmed the automatically computed result including the data protection configurations (which are used, as it were, as a suggestion for a particular setting).

In one specific embodiment of the present invention, not only are the device metadata and the service metadata accounted for to calculate the data protection configurations, but also previously acquired contextual parameters, as well. The contextual parameters may also be configurable in the preparation phase of the method and may relate to the context of the recorded sensor data, the device, and/or the service; in particular, they may include a positional information item.

A technical advantage of this is that the security configurations of the device may be adapted and set even more specifically to the application case.

In another specific embodiment of the present invention, the method includes the following steps:
  initiating an additive operation for integrating the electronic device in the network;
  acquiring communications data for the electronic device, in order to establish a data channel with the electronic device before it is integrated in the network.

As already explained above, the data channel may be set up as a data connection additional to or separate or different from the intended integration in the network. The connection is set up, in particular, between a control unit and the device to be integrated, in order to control its integration with regard to the data protection.

In a further specific embodiment of the present invention, the computed data protection configurations are outputted on a user interface of a control unit, in order to acquire a validation signal or to record a change, before they are transmitted to the device for automatic data protection configuration. An advantage of this is that the method may be configured to be transparent for the user, and that prior to implementing and/or applying the suggested data protection settings on the device he/she may still look through and check them and possibly confirm or discard or modify them according to his/her requirements. In another specific embodiment of the present invention, in order to compute the data protection configurations, stored (historical) configuration profiles of similar devices or devices already integrated in the network are accessed. Consequently, earlier security settings may be taken into consideration and have an influence on the computed result. The result is always provided in the form of data protection configurations. The result may be stored with the input data (metadata of the device and services) in a coordinated manner (with an assignment to the specific device and/or its user and/or the services classified as relevant).

The confirmation is also stored via input of the validation signal, and this data may be fed back to the system, in order to configure it as a self-learning system.

As already described above, one of the devices already integrated in the network may act as a control unit. Using the control unit, a device to be newly integrated in the system may be configured with regard to its data protection verification. To that end, the control unit may include a user interface. Alternatively, the control unit is connected, in a manner allowing processing and transfer of data, to another device of the device group, on which a user interface is provided for interacting with the user, e.g., a mobile electronic device, such as a smartphone. All of the steps of the method described above may be executed on the control unit. However, as an alternative, selected, individual steps of the method may also be outsourced to other entities. It is equally possible for all of the steps of the method to be executed on the device to be integrated, itself. An advantage of this is that the device metadata are directly available and may be fetched out of the device, without having to be transmitted to an external control unit beforehand. In this case, the control unit merges, as it were, with the device to be integrated.

In a further specific embodiment of the present invention, the device metadata for the electronic device are automatically read in via the established data channel. In particular, the device metadata are actively requested on the part of the control unit, when the user initiates a procedure for integrating a new device. To that end, centrally stored data sets may be accessed, or the server may be accessed directly.

The method may be implemented as software in the form of a computer program. It may also be integrated in a device or on a computer-based unit, in particular, in a control unit or on a(n) (electronic) device, in the form of a hardware module, e.g., as a microprocessor circuit or application-specific, integrated circuit (ASIC), or as an embedded system. The computer program may also be stored on a computer-readable storage medium. It may also be loaded, as an application, from a server onto the specific device via a data connection, in order to install and execute it there.

In a further aspect, the present invention relates to a data protection module for the protection of data of a device in response to its integration in a network system for providing services of processing data of the device, the module including:
- an input device interface for acquiring device metadata for the device to be integrated;
- an input service interface for acquiring service metadata of services, which are suitable for processing the data recorded on the device;
- a computational unit, which is intended for computing data protection configurations for the device, in order to configure its data protection, in response to its integration in the network, on the basis of the acquired device metadata and the acquired service metadata.

The data protection module may be implemented on each of the devices or on selected devices of the device group; it may also be implemented on only a central control unit of the device group, but still be responsible for all of the devices of the device group. The data protection module may be capable of being activated and deactivated. The data protection module may be preset to be always activated, when a new electronic device not yet integrated in the network is detected.

In a further aspect, the present invention relates to a network system for processing data, including:
- a number of electronic devices, which are already integrated in the network, and on which (sensor or device) data are locally recorded, which are intended for processing by at least one service provided in the network;
- a number of servers, which are connected to the network, and on which services for processing the data are provided;
- a data protection module as described above.

DETAILED DESCRIPTION

Figure 1:
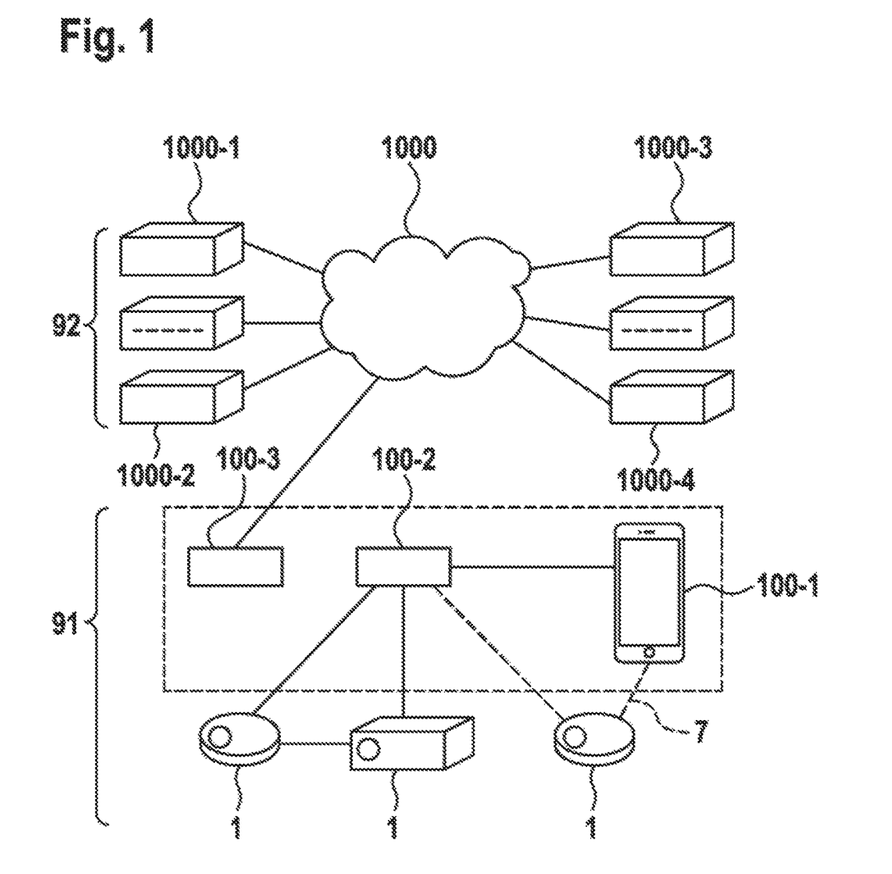
FIG. 1 shows a schematic representation of a network system according to an advantageous specific embodiment of the present invention.

FIG. 1 shows an overview of a network system. Provided in this, is a group of electronic devices 1, which exchange data in a first network 91. Devices 1 may sensors or electronic processing units, which are intended for local data acquisition or data generation, e.g., in a sensor network in the automotive branch, in particular, for recording sensor data in the passenger compartment of a vehicle. The sensors are intended for recording physical or technical parameters, e.g., an interior temperature or an interior sound level. They may also be used as a smoke alarm or for monitoring a sitting position of the driver, from which a state of sleep or state of wakefulness may be deduced. Sensor devices 1 are connected to each other directly via a central, local communications entity, in particular, a communications control unit (CCU), and/or indirectly via a communications entity. The user controls the interaction, using the communications entity, which may act as a control unit 100-2 having a user interface, or using a user interface of a device 100-1 connected to the control unit, such as a smartphone or another mobile electronic device. Using a device 100-3 having an interface to a second network 92, in particular, to the Internet, communication takes place, via Internet infrastructure 1000, with remote servers, which, in FIG. 1, are denoted exemplarily by reference numerals 1000-1, 1000-2, 1000-3, 1000-4. The device, which includes a module for access to second network 92, which may take the form of a gateway 100-3. The servers may be servers of a manufacturer's system (in particular, a motor vehicle manufacturer) or independent servers of third-party providers of services. The services centrally provided are used for processing the locally recorded data, which come from devices 1 (e.g., sensor data of the passenger compartment or of the driver). The sensor data may come, e.g., from a passenger compartment camera, a window lifter sensor, a microphone for voice recognition, a cellular phone, or other electronic sensor devices or wearables, which the driver carries with him/her.

In FIG. 1, control unit 100-2, gateway 100-3 and the cellular phone having user interface 100-1 are represented as separate devices and/or distributed over a plurality of physical products. In one advantageous, alternative specific embodiment of the present invention, the three devices 100-2, 100-3, 100-1 may also be provided in one device. This is intended to be denoted by the box formed by a dashed line.

If a "new" device 1, e.g., an interior camera, is now added to local network 91, then a data channel 7 is initially set up between control unit 100-2 or a connected smartphone 100-1 (mobile device having a user interface), and the new device 1 to be integrated. In particular, the control unit 100-2 configured as a smartphone requests a communications address (MAC or IP address) of the new device. Using this data channel 7, control unit 100-2 may then acquire device metadata 41 regarding the device, such as when the device is active, which sensor data it records, in which time interval it records sensor data, etc.

Beforehand, concurrently or subsequently, control unit 100-2 acquires service metadata 42 about the service(s) on servers 1000-1, . . . , 1000-4, which is/are intended for processing the data. This occurs with the aid of gateway 100-3.

On the basis of acquired device metadata 41 and acquired service metadata 42, control unit 100-2 may compute data protection configurations automatically and, optionally, with access to a set of rules.

Figure 2:
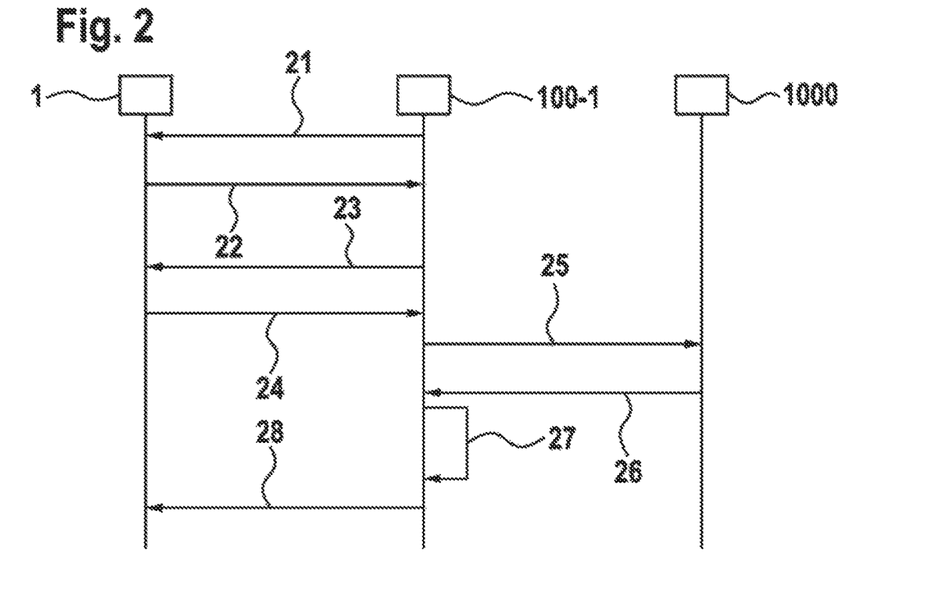
FIG. 2 is a UML diagram for the exchange of data between an electronic device, which is intended to be integrated in the network system, and a control unit and a server.

FIG. 2 shows an exchange of data in the form of a sequence diagram, in connection with the integration of a new device 1 in network 91. In this exemplary embodiment, the control of the integration and data protection configuration operation takes place on smartphone 100-1, which acts as a control unit in this example. Smartphone 100-1 interacts with the new sensor device 1 to be integrated, as well as with a central cloud structure 1000, which takes the form of Internet infrastructure, and to which servers 1000-1, . . . , 1000-4 are connected.

Using transaction 21, a command prompt is sent to device 1 to output a communications address. In transaction 22, this is sent back to smartphone 100-1. In transaction 23, a command prompt for sending device metadata 41 is transmitted, the device metadata being provided in transaction 24. Using transaction 25, service metadata 42 is requested from central Internet infrastructure 1000 or a central node, and is provided in transaction 26. Device 100-1 may compute data protection configuration 43 from the acquired metadata. This is outputted on the user interface of mobile radio device 100-1 for the purpose of validation by the user. The validation occurs in step 27. After successful confirmation, then, in transaction 28, data protection configurations 43 may be transmitted to device 1 for execution.

Figure 3:
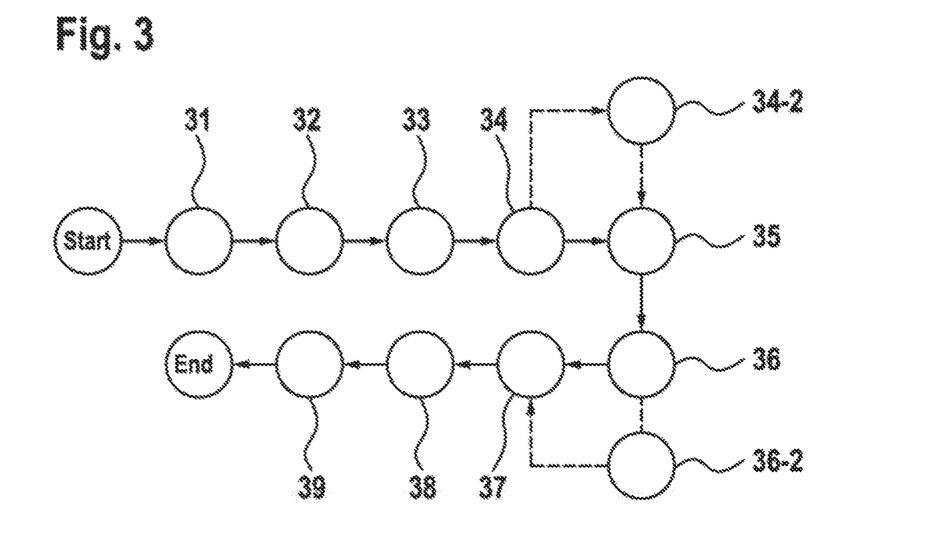
FIG. 3 shows a flow chart of method steps in different variants of a specific embodiment of the present invention.

A sequence of a method for configuring data protection in response to the integration of a new device 1 in network 91, in accordance with a specific embodiment of the present invention, is represented in FIG. 3. The method is executed on control unit 100-2. After the start of the method, in step 31, an additive operation for device 1 is initiated by the user, on control unit 100-2. In step 32, the communications data for setting up data channel 7 are acquired. In step 33, data channel 7 may be set up. In step 34, device metadata 41 may be acquired via constructed data channel 7. Optionally, further input data may be acquired in step 34-2 (this is indicated in FIG. 2, using the dashed line). In this context, e.g., stored configuration profiles including historical data protection configurations may be accessed. In step 35, services, which may be selected for the processing of the device data, are determined. In step 36, service metadata 42 are acquired. Optionally, and shown in FIG. 2 by a dashed line, contextual parameters may additionally be acquired in step 36-2. The contextual parameters include, e.g., positional data or other information regarding the context of the acquired data and/or of the processing service (e.g., country/region, in which the server is operated, etc.). In step 37, data protection configurations 43 for device 1 are computed, and in step 38, they may be displayed on a user interface for validation, before they are passed on, in step 39, to device 1 for execution. After that, the method may end or be repeated for another device.

Figure 4:
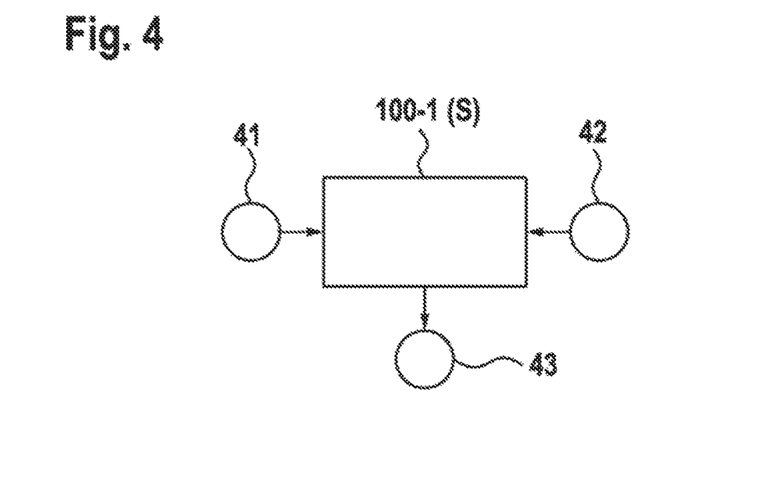
FIG. 4 is a schematic representation of a control unit.

FIG. 4 schematically shows, in the manner of a block diagram, a smartphone 100-1, which is intended for executing the method of integrating the one device 1 so as to be configured for data protection, and which is, to that end, configured with corresponding electronic modules (e.g., ASIC's), which are intended for computing data protection configurations 43. Device metadata 41 and service metadata 42 are used as inputs for the computation. As a result, a data set including the computed data protection configurations is supplied via an output interface. The designation ("S") under reference numeral 100-1 in FIG. 4 is intended to show clearly that the specific electronic component or device is configured to perform the control functionality. Thus, it may act as a control unit 100-2. In one simple, advantageous specific embodiment of the present invention, the device, in which the method is executed, may also be the new device 1 to be integrated or another device of the device group.

Figure 5:
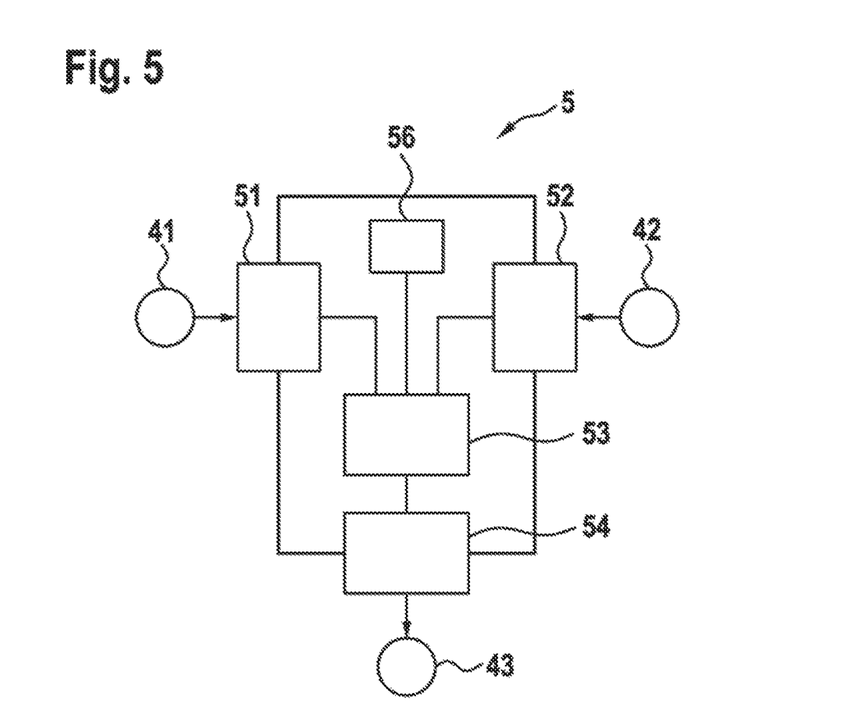
FIG. 5 shows a data protection module according to a specific embodiment of the present invention.

FIG. 5 schematically shows, in the form of a block diagram, a data protection module 5 in a specific embodiment of the present invention. It includes an input device interface 51 for acquiring device metadata 41 for the device 1 to be integrated; as well as an input service interface 52 for acquiring service metadata 42 for the services, which are suitable for processing the data recorded or generated on device 1; and a computation unit 53, which is intended for computing the result including data protection configurations 43 for device 1, in order to configure its data protection, in response to its integration in network 91, 92, on the basis of acquired device metadata 41 and acquired service metadata 42. The result is outputted on an output interface 54. It may be an MMI (man-machine interface). Output interface 54 may also include a section for relaying data protection configurations 43 to device 1 and/or to a storage device 56 and/or to further entities. Storage device 56 is used for storing the result including data protection configurations 43 and may additionally store the validation signal correspondingly.

In one specific embodiment of the present invention, computation unit 53 of data protection module 5 accesses storage device 56, in order to fetch out and use configuration profiles of historic configuration operations and/or rules for computation.

Data protection configurations 43 may be static or dynamic. In the static form, they are computed once for device 1 and applied there and are active for the entire operating time of device 1. In the dynamic form, they are intended only for an operating session (operating phase as of the activation of the device) and/or for a particular time interval, and are subsequently recalculated again. This is particularly suitable for applications, whose context changes very rapidly and often. Thus, for a dynamic data protection configuration 43, one exemplary embodiment is the networking of a moving automobile with different infrastructure devices along the route. Data protection configurations 43 determine which security parameters are valid and/or are to be used for sending the sensor data or the other device data to external services (which are executed on other devices 1 and/or on servers 1000-1, . . . , 1000-4). Data protection configurations 43 may include at least a portion of the following information:

- information as to whether the data may be transmitted at all and/or which data types may be transmitted;
- information regarding to which services and/or service operators (persons and/or organizations) it may be supplied;
- information as to in which time interval, in which form (encrypted/plain text), via which data connection/protocol they may be transmitted;
- information as to whether they may be transmitted completely or only partially, and/or at what accuracy they may be transmitted;
- information as to for what purpose the data may be used;
- information regarding in which geographic region the data may be used by the receiving service and/or ascertained by the transmitting device;
- information as to by which cryptographic algorithms the data are to be processed beforehand.

In summary, it may be established, as a fundamental idea of the present invention, that a system is to be provided, which aids in the configuration of security settings for a local electronic device in a device group and, to that end, utilizes available metadata from the device group and from a superordinate network 92. The computed data protection configurations are used for protecting data of the user and are intended to ensure that his/her personal data or sensitive data, which are recorded or provided on local device 1, are only passed on to external services in compliance with an access control mechanism (determined by the computed data protection configuration).

The method may be applied, when the specific system is brought into operation or used (e.g., the vehicle). In this case, the data protection module of the present invention is always active, when the vehicle is brought into operation, which means that for each operational use, data protection configurations are generated and applied. However, in order to prevent recurrent configurations, an alternative specific embodiment of the present invention also makes it possible for the method only to be used during initial operation (that is, e.g., when the driver uses the vehicle for the first time or uses particular devices 1 in the vehicle for the first time). However, hybrid forms are also applicable, which allow for the data protection module to be activated and deactivated and, therefore, for the method to be executed only conditionally, for instance, when the vehicle owner activates and/or deactivates the automatic configuration, using an explicit activation command and/or a deactivation command, respectively.

Finally, it should be pointed out that the description of the present invention and the exemplary embodiments should, as a matter of principle, not be considered restrictive with regard to a particular physical implementation of the present invention. Different combinations of all of the features explained and shown in connection with individual specific embodiments of the present invention may be provided in the subject matter of the invention, in order to simultaneously produce their advantageous effects.

For one skilled in the art, it is particularly evident that the present invention may be used not only in the automotive branch for smart car systems, but also for other areas, such as smart home systems, in which the sensors are, e.g., optical sensors, acoustic sensors and/or sensors in and for intelligent household devices (electric kettle, refrigerator, microwave, espresso machine, etc.) (temperature sensor, etc.). Another example of application is medical systems, in which the sensors are sometimes included in wearables (smart watch, smart ring, etc.).

The local nodes of devices 1 may be separate from the central nodes, on which servers 1000-1, . . . , 1000-4 are installed. First local network 91 may be different from second network 92. However, in special specific embodiments of the present invention, for instance, if devices 1 are directly connected to the Internet and the services, it is also possible for the first and second networks to be the same network. However, the nodes of second network 92 are normally to be reached via a gateway 100-3.

The scope of protection of the present invention is given by the following claims and is not limited by the features explained in the description or shown in the figures.

What is claimed is:

1. A method for integrating a device in a network in a manner configured for data protection, so that on the device, locally recorded data may be transmitted to a service for the purpose of processing, the method comprising:
   acquiring device metadata for the device;
   acquiring service metadata of services, which are suitable for processing the data recorded on the device; and
   computing, in response to integrating the device in the network, data protection configurations for the device based on the acquired device metadata and the acquired service metadata, to configure data protection of the device;
   wherein the computed data protection configurations determine: (i) which portions of the data recorded locally on the device are to be transmitted to an external service, (ii) to which external service the portions of the data recorded locally on the device are to be transmitted, and (iii) in accordance with which transmission plan the portions of the data recorded locally on the device are to be transmitted.

2. The method of claim 1, further comprising:
   initiating an additive operation for the device;
   acquiring communications data for the device to establish a data channel with the device.

3. The method of claim 1, further comprising:
   acquiring contextual parameters;
   wherein the computing of the data protection configurations also accounts for acquired contextual parameters.

4. The method of claim 1, wherein the computed data protection configurations are outputted on a user interface of a control unit or of a device connected to the control unit, to acquire a validation signal from the user or to detect a change by the user, before the computed data protection configurations are transmitted to the device for automatic data protection configuration.

5. The method of claim 1, wherein to compute the data protection configurations, stored configuration profiles of similar devices or of devices already integrated in the network are accessed.

6. The method of claim 1, wherein at least a number of method tasks are executed on a device acting as a control unit or on the device to be integrated.

7. The method of claim 1, wherein the device metadata for the device are acquired automatically and, in particular, requested actively, via the established data channel.

8. The method of claim 1, wherein to compute the data protection configurations for the device, a set of rules, in which rules for data security are stored, is accessed to apply these for the device.

9. A non-transitory computer readable medium having a computer program, which is executable by a processor, comprising:
- a program code arrangement having computer program code for integrating a device in a network in a manner configured for data protection, so that on the device, locally recorded data may be transmitted to a service for the purpose of processing, by performing the following:
  - acquiring device metadata for the device;
  - acquiring service metadata of services, which are suitable for processing the data recorded on the device; and
  - computing, in response to integrating the device in the network, data protection configurations for the device based on the acquired device metadata and the acquired service metadata, to configure data protection of the device;
- wherein the computed data protection configurations determine: (i) which portions of the data recorded locally on the device are to be transmitted to an external service, (ii) to which external service the portions of the data recorded locally on the device are to be transmitted, and (iii) in accordance with which transmission plan the portions of the data recorded locally on the device are to be transmitted.

10. A data protection module for protecting data of a device in response to its integration in a network for providing services for processing data of the device, comprising:
- an input device interface for acquiring device metadata for the device to be integrated;
- an input service interface for acquiring service metadata of services, which are for processing the data recorded on the device;
- a computational unit, which is for computing, in response to integrating the device in the network, data protection configurations for the device based on the acquired device metadata and the acquired service metadata, to configure data protection of the device;
- wherein the computed data protection configurations determine: (i) which portions of the data recorded locally on the device are to be transmitted to an external service, (ii) to which external service the portions of the data recorded locally on the device are to be transmitted, and (iii) in accordance with which transmission plan the portions of the data recorded locally on the device are to be transmitted.

11. The data protection module of claim 10, wherein the data protection module is implemented on a control unit or on the device to be integrated.

12. A network system for processing data, comprising:
- a number of devices, which are already integrated in a first network, and on which data are locally recorded or supplied, which are designated for processing by at least one service provided in the network system;
- a number of servers, which are connected to a second network and are connected to the devices via a gateway node, and on which services for processing the data are provided; and
- a data protection module data protection module for protecting data, including:
  - an input device interface for acquiring device metadata for the device to be integrated;
  - an input service interface for acquiring service metadata of services, which are for processing the data recorded on the device;
  - a computational unit, which is for computing, in response to integrating the device in the network, data protection configurations for the device based on the acquired device metadata and the acquired service metadata, to configure data protection of the device;
  - wherein the computed data protection configurations determine: (i) which portions of the data recorded locally on the device are to be transmitted to an external service, (ii) to which external service the portions of the data recorded locally on the device are to be transmitted, and (iii) in accordance with which transmission plan the portions of the data recorded locally on the device are to be transmitted.

* * * * *